Nov. 13, 1923. 1,473,945

E. C. WHITING

AUTOMOBILE SEAT

Filed Sept. 24, 1921 2 Sheets-Sheet 1

Inventor:
Ernest C. Whiting.
by Heard Smith & Tennant.
Atty's.

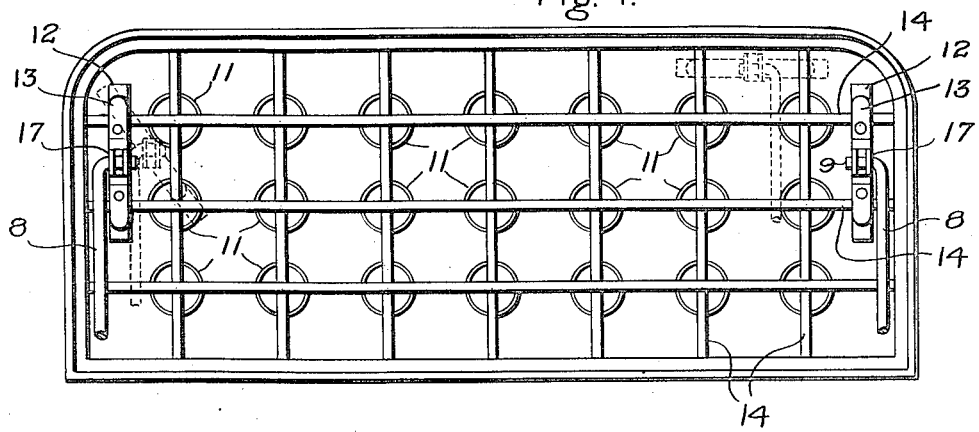
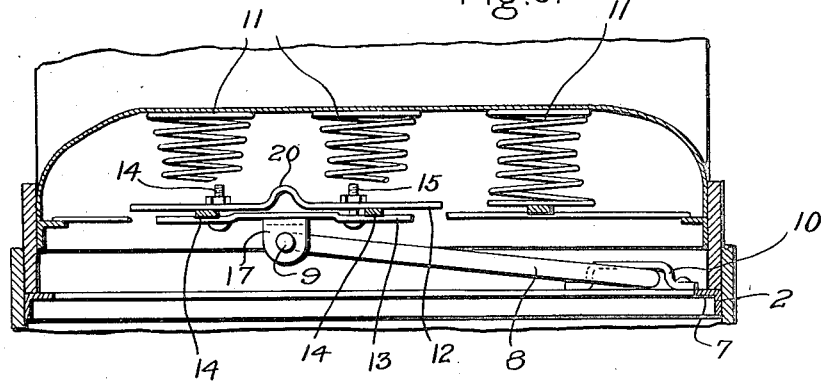
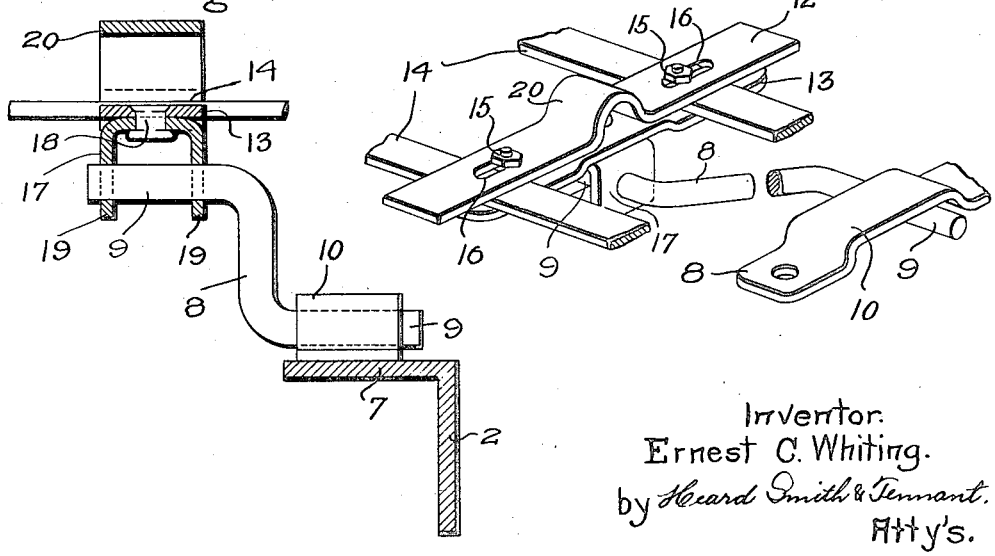

Patented Nov. 13, 1923.

1,473,945

UNITED STATES PATENT OFFICE.

ERNEST C. WHITING, OF ALLSTON, MASSACHUSETTS.

AUTOMOBILE SEAT.

Application filed September 24, 1921. Serial No. 502,930.

*To all whom it may concern:*

Be it known that I, ERNEST C. WHITING, a citizen of the United States, and resident of Allston, county of Suffolk, State of Massachusetts, have invented an Improvement in Automobile Seats, of which the following description, in connection with the accompanying drawing, is a specification, like characters on the drawing representing like parts.

This invention relates to seats for automobiles and the like and it has for its object to provide a novel way of connecting the seat member or cushion to the seat frame so as to permit the cushion to be folded against the back of the seat whenever it is desired to lift the cushion to get access to a compartment beneath the latter.

Automobile seats are commonly made so that whenever it is desired to obtain access to a compartment beneath the seat it is necessary to lift the cushion entirely from the seat frame and deposit it in some other location. My invention obviates this necessity as it provides a cushion or seat member which can be folded against the back of the seat whenever it is desired to gain access to a compartment beneath the seat.

In order to give an understanding of my invention I have illustrated in the drawings some selected embodiments thereof which will now be described after which the novel features will be pointed out in the appended claims.

In the drawings, Fig. 1 is a view partly in section showing an automobile seat embodying my invention with the seat in its normal position.

Fig. 4 is an under side view of a seat showing one way of connecting the links thereto.

Fig. 5 is a transverse section through the seat shown in Fig. 4.

Fig. 6 is an enlarged view of the link construction shown in Figs. 4 and 5.

Fig. 7 is a transverse view thereof.

Figure 1:
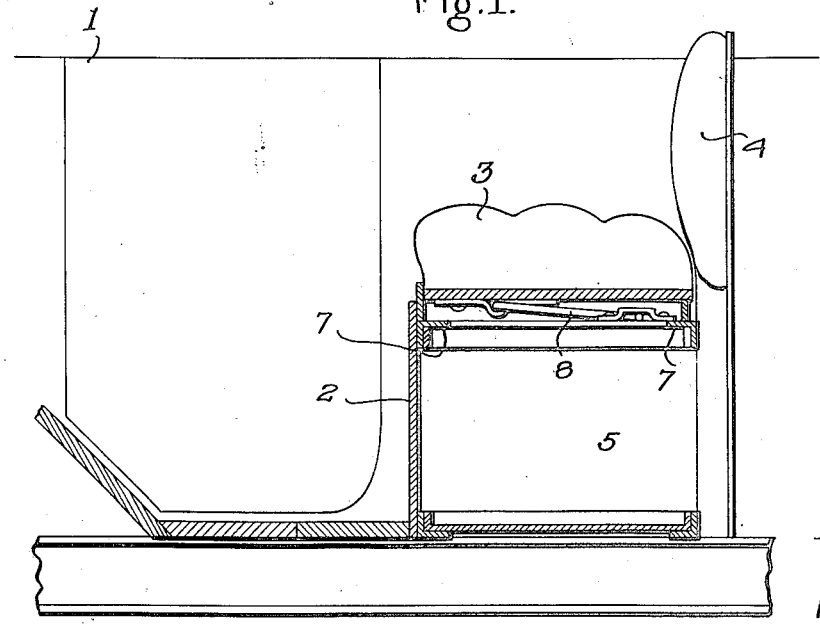
Figure 3:
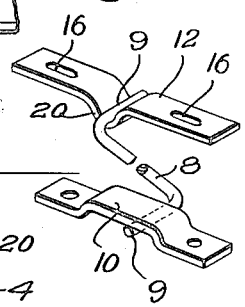
Fig. 3 is a transverse view of the link connection between the seat cushion and seat frame.

In the drawings 1 indicates a portion of an automobile which is provided with a seat comprising a seat frame 2, a cushion or seat member 3 supported on the seat frame and seat back 4. The seat frame 2 is shown as enclosing a compartment 5 to which access may be gained by lifting the seat member 3 off from the frame, said seat frame having an opening 6 leading to the compartment. The seat frame is shown as having a rest or flange 7 surrounding the aperture 6 and on which the seat 3 is supported.

Figure 2:
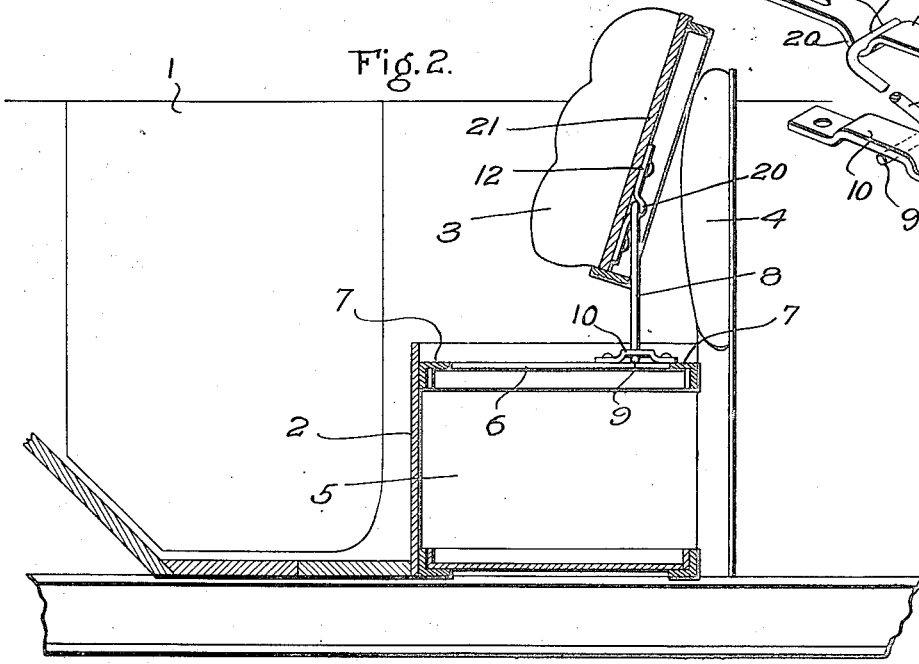
Fig. 2 is a similar view showing the seat elevated and folded against the back.

The parts thus far described are or may be all as usual in automobiles and form no part of my present invention. In an automobile seat embodying my invention the seat member 3 is connected to the seat frame 2 by means of links 8, there preferably being one link at each end of the seat member and these links are pivoted to the under side of the seat member and to the seat frame so as to permit the seat member to be folded up against the seat back 4 as shown in Fig. 2. In thus raising the seat member the rear edge of the seat will first be lifted thus tilting the seat about its front edge and then the seat can be swung up into its open position, shown in Fig. 2, in which position it will be readily sustained by the links. When the seat member is in this position the opening 6 is uncovered so that access to the compartment 5 may be readily had.

The links 8 may be connected to the seat frame and seat member in various ways without departing from my invention. I will preferably make each link with the laterally-extending portion 9 at each end, said portions 9 constituting trunnions or pivots about which the links may swing. For securing the links to the seat frame I will preferably employ arched straps 10 which are secured to the flange 7 by screws or rivets and beneath which the laterally-extending ends 9 of the links 8 are received. This makes a sliding pivotal connection between each link and the seat frame. Where the bottom portion of the seat member on which the springs 11 are supported is in the form of a grid work, as shown in Figs. 4 and 5 I propose to employ the swivelled clamping connection shown in Figs. 6 and 7 for pivotally connecting the links of the seat member. tion shown in Figs. 6 and 7 for pivotally connecting the links to the seat member. This connection comprises two clamping members 12 and 13 which are adapted to be clamped to the strap or wire members 14 on which the springs 11 are sustained, said clamping members being placed on opposite sides of the strap or wires 14 and being clamped thereto by means of clamping bolts 15. These clamping members are provided with slots 16 through which the clamping bolts extend thus providing a necessary adjustment for the clamping bolts so as to enable them to accommodate wires or straps which are spaced differently.

The clamping member 13 has swivelled thereto a member 17 to which the upper end of the link 8 is pivoted. This member 17 is shown as a U-shaped member which is swivelled to the clamping member 13 as shown at 18 and the two arms 19 of the members 17 are provided with apertures through which the end 9 of the link extends.

The purpose of swivelling the member 19 to the clamp is to permit the clamp to be secured to the seat member in different locations as indicated in Fig. 4, which shows in full lines the two clamping members fastened to two longitudinally-extending straps or wires 14. Fig. 4 shows at the left end in dotted lines the clamping member set at an angle and secured at one end to a longitudinally-extending member 14 and at its other end to a transversely-extending member 14. At the right in Fig. 4 the clamp is shown in dotted lines as attached to two transversely-extending members 14. By using this swivelled construction it is possible to place the clamping members in any desired angular position.

The clamping member 12 is shown as formed with a loop 20 so that said member alone can be used for connecting the link to a seat having a wooden bottom as shown in Figs. 1 and 2. When used in this way the two clamping members will be disconnected from each other and the clamping member 12 may be screwed to the wooden bottom 21 of the seat 3 as shown in Figs. 1 and 2, the loop 20 forming a bearing for the trunnion 9 at the upper end of the link. With the device constructed as illustrated, therefore, the clamping connection shown in Figs. 6 and 7 may be used for pivotally connecting the links either to a seat having a metal grid work bottom or to a seat having a wooden bottom. In the latter case the parts 13, 15 and 17 are discarded and the part 12 only is used. The sliding pivotal connection between the links and the seat frame is desirable to permit the seat to have more freedom of movement in swinging it from closed to open position and vice versa. Furthermore by using this sliding pivotal connection it is possible to fold the seat member closer against the back when said seat member is in open position, shown in Fig. 2 by simply sliding the lower pivot toward the rear in the loop formed by the strap 10.

It will thus be seen that with my invention it is not necessary to entirely remove the seat member 3 when it is desired to gain access to the compartment 5, it simply being necessary to tilt the seat about its front edge and then to fold it upwardly against the back, as shown in Fig. 2. The links 8 operate not only to guide the seat but also operate to retain said seat in its open position.

While I have illustrated some selected embodiments of my invention I do not wish to be limited to the constructional features shown.

I claim.

1. In an automobile seat, the combination with a seat frame and a seat back rising therefrom, of a cushion member removably sustained on the seat frame, and links pivoted to the under side of the cushion member near its front edge and having a horizontally-sliding pivotal connection with the seat frame near its rear portion, whereby the cushion member can be raised by lifting the rear edge thereof and then swinging said cushion member upwardly and backwardly against the back, said links operating to support the cushion in its raised position.

2. In an automobile seat, the combination with a seat frame and a seat back rising therefrom, of a cushion member removably sustained on the seat frame, and a link at each end of the cushion member pivoted to the under side thereof near its front portion and pivoted to the seat frame near its rear portion, whereby the cushion member can be raised into a substantially-vertical position with the under face thereof resting against the back by lifting the rear edge of the cushion member and then swinging the cushion member upwardly and backwardly, said links co-operating with the back to support the cushion member in such raised position.

3. In an automobile seat, the combination with a seat frame, of a cushion member removably sustained thereby, links pivotally connected at one end to the seat frame, bearings to which the upper ends of the links are pivoted, a clamping device for securing each bearing to the cushion member, and a swivel connection between each bearing and its clamping device.

4. In an automobile seat, the combination with a seat frame, of a cushion seat member removably sustained thereby, links pivotally connected at one end to the seat frame, clamping members adjustably clamped to the seat member and bearings swivelled to the clamping members and to which the upper ends of the links are connected, the axis about which each bearing member swivels being at right angles to the axis about which the links turn.

In testimony whereof, I have signed my name to this specification.

ERNEST C. WHITING.